United States Patent
Dupey et al.

(10) Patent No.: US 10,430,394 B2
(45) Date of Patent: Oct. 1, 2019

(54) DATA MASKING NAME DATA

(71) Applicant: Business Objects Software Limited, Dublin (IE)

(72) Inventors: Ronald Dupey, Onalaska, WI (US); Peter McDonald, Onalaska, WI (US)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 353 days.

(21) Appl. No.: 15/365,202

(22) Filed: Nov. 30, 2016

(65) Prior Publication Data

US 2018/0150484 A1     May 31, 2018

(51) Int. Cl.
  *G06F 16/215*   (2019.01)
  *G06F 21/62*    (2013.01)
  *G06N 7/00*     (2006.01)

(52) U.S. Cl.
  CPC ........ *G06F 16/215* (2019.01); *G06F 21/6254* (2013.01); *G06N 7/005* (2013.01)

(58) Field of Classification Search
  CPC .... G06F 16/215; G06F 21/6254; G06N 7/005
  See application file for complete search history.

(56) References Cited

U.S. PATENT DOCUMENTS

| | | | |
|---|---|---|---|
| 9,141,659 B1* | 9/2015 | Middleman | G06F 17/30371 |
| 2006/0179075 A1* | 8/2006 | Fay | G06F 21/6245 |
| 2008/0065665 A1* | 3/2008 | Pomroy | G06F 17/30286 |
| 2014/0280261 A1* | 9/2014 | Butler | G06F 21/6254 707/756 |
| 2016/0127325 A1* | 5/2016 | Odenheimer | H04L 63/0428 713/168 |
| 2016/0275637 A1* | 9/2016 | Grant | G06Q 30/0214 |

* cited by examiner

*Primary Examiner* — Jorge A Casanova
(74) *Attorney, Agent, or Firm* — Buckley, Maschoff & Talwalkar LLC

(57) ABSTRACT

A system includes reception of name data, determination, for each of a plurality of name properties, of an associated property value based on the name data, determination of a gender classification based on the property values, and, for each property value, generation of a substitute property value based on the property associated with the property value and the gender classification.

14 Claims, 18 Drawing Sheets

| givenName1 (25%) | givenName2 (25%) | familyName1 (15%) | familyName2 (15%) | suffix (20%) |
|---|---|---|---|---|
| English -.75 | none | French -.5 | none | none |
| Spanish -.1 | | English -.1 | | |
| Dutch -.05 | | | | |

| ENTRIES | |
|---|---|
| ENTRY_ID | ENTRY |
| 1 | James |
| 2 | John |
| 3 | Robert |
| 4 | Michael |
| 5 | William |
| 6 | Mary |
| 7 | Elizabeth |
| 8 | Jennifer |
| 9 | Susan |
| 10 | Maria |
| 11 | Chris |
| 12 | Pat |
| 13 | Finley |
| 14 | Avery |
| 15 | Peyton |
| 16 | Smith |
| 17 | Johnson |
| 18 | Brown |
| 19 | Jones |
| 20 | Miller |

610

| CLASSIFICATIONS | | | | |
|---|---|---|---|---|
| ENTRY_ID | ETHNICITY | SCRIPT | PROPERTY | GENDER |
| 1 | English | Latin | Given Name | Male |
| 2 | English | Latin | Given Name | Male |
| 3 | English | Latin | Given Name | Male |
| 4 | English | Latin | Given Name | Male |
| 5 | English | Latin | Given Name | Male |
| 6 | English | Latin | Given Name | Female |
| 7 | English | Latin | Given Name | Female |
| 8 | English | Latin | Given Name | Female |
| 9 | English | Latin | Given Name | Female |
| 10 | English | Latin | Given Name | Female |
| 11 | English | Latin | Given Name | Ambiguous |
| 12 | English | Latin | Given Name | Ambiguous |
| 13 | English | Latin | Given Name | Ambiguous |
| 14 | English | Latin | Given Name | Ambiguous |
| 15 | English | Latin | Given Name | Ambiguous |
| 16 | English | Latin | Family Name | Ambiguous |
| 17 | English | Latin | Family Name | Ambiguous |
| 18 | English | Latin | Family Name | Ambiguous |
| 19 | English | Latin | Family Name | Ambiguous |
| 20 | English | Latin | Family Name | Ambiguous |

| ENTRIES | |
|---|---|
| ENTRY_ID | ENTRY |
| 21 | Thomas |
| 22 | Nicolas |
| 23 | Julien |
| 24 | Quentin |
| 25 | Alexandre |
| 26 | Marie |
| 27 | Léa |
| 28 | Manon |
| 29 | Chloé |
| 30 | Laura |
| 31 | Camille |
| 32 | Claude |
| 33 | Dominique |
| 34 | Florence |
| 35 | Maxime |
| 36 | Martin |
| 37 | Bernard |
| 38 | Dubois |
| 39 | Thomas |
| 40 | Robert |

710

| CLASSIFICATIONS | | | | |
|---|---|---|---|---|
| ENTRY_ID | ETHNICITY | SCRIPT | PROPERTY | GENDER |
| 21 | French | Latin | Given Name | Male |
| 22 | French | Latin | Given Name | Male |
| 23 | French | Latin | Given Name | Male |
| 24 | French | Latin | Given Name | Male |
| 25 | French | Latin | Given Name | Male |
| 26 | French | Latin | Given Name | Female |
| 27 | French | Latin | Given Name | Female |
| 28 | French | Latin | Given Name | Female |
| 29 | French | Latin | Given Name | Female |
| 30 | French | Latin | Given Name | Female |
| 31 | French | Latin | Given Name | Ambiguous |
| 32 | French | Latin | Given Name | Ambiguous |
| 33 | French | Latin | Given Name | Ambiguous |
| 34 | French | Latin | Given Name | Ambiguous |
| 35 | French | Latin | Given Name | Ambiguous |
| 36 | French | Latin | Family Name | Ambiguous |
| 37 | French | Latin | Family Name | Ambiguous |
| 38 | French | Latin | Family Name | Ambiguous |
| 39 | French | Latin | Family Name | Ambiguous |
| 40 | French | Latin | Family Name | Ambiguous |

ENTRIES (810)

| ENTRY_ID | ENTRY |
|---|---|
| 40 | Robert |

CLASSIFICATIONS (820)

| ENTRY_ID | ETHNICITY | SCRIPT | PROPERTY | GENDER |
|---|---|---|---|---|
| 40 | English | Latin | Given Name | Male |
| 40 | French | Latin | Family Name | Ambiguous |

*FIG. 8*

ENTRIES (910)

| ENTRY_ID | ENTRY |
|---|---|
| 185 | Jean |

CLASSIFICATIONS (920)

| ENTRY_ID | ETHNICITY | SCRIPT | PROPERTY | GENDER |
|---|---|---|---|---|
| 185 | English | Latin | Given Name | Female |
| 185 | French | Latin | Given Name | Male |

*FIG. 9*

ENTRIES (1010)

| ENTRY_ID | ENTRY |
|---|---|
| 311 | Yurkov |
| 312 | Yurkova |

CLASSIFICATIONS (1020)

| ENTRY_ID | ETHNICITY | SCRIPT | PROPERTY | GENDER |
|---|---|---|---|---|
| 311 | Russian | Latin | Family Name | Male |
| 312 | Russian | Latin | Family Name | Female |

*FIG. 10*

| ENTRIES 1110 | |
|---|---|
| ENTRY_ID | ENTRY |
| 41 | 陽斗 |
| 42 | Haruto |
| 43 | まる |
| 44 | マルと |
| 45 | 颯太ト |
| 46 | Sota |
| 47 | そた |
| 48 | ソタ |
| 49 | 結衣 |
| 50 | Yui |
| 51 | ゆい |
| 52 | ユイ |
| 53 | 莉央 |
| 54 | Rio |
| 55 | りお |
| 56 | リオ |
| 57 | 寛 |
| 58 | Hiro |
| 59 | ひろ |
| 60 | ヒロ |
| 61 | 幸 |
| 62 | Yuki |
| 63 | ゆき |
| 64 | ユキ |
| 65 | 佐藤 |
| 66 | Sato |
| 67 | さと |
| 68 | サト |
| 69 | 鈴木 |
| 70 | Suzuki |
| 71 | すづき |
| 72 | スヅキ |

| CLASSIFICATIONS 1120 | | | | |
|---|---|---|---|---|
| ENTRY_ID | ETHNICITY | SCRIPT | PROPERTY | GENDER |
| 41 | Japanese | CJK | Given Name | Male |
| 42 | Japanese | Latin | Given Name | Male |
| 43 | Japanese | Hiragana | Given Name | Male |
| 44 | Japanese | Katakana | Given Name | Male |
| 45 | Japanese | CJK | Given Name | Male |
| 46 | Japanese | Latin | Given Name | Male |
| 47 | Japanese | Hiragana | Given Name | Male |
| 48 | Japanese | Katakana | Given Name | Male |
| 49 | Japanese | CJK | Given Name | Female |
| 50 | Japanese | Latin | Given Name | Female |
| 51 | Japanese | Hiragana | Given Name | Female |
| 52 | Japanese | Katakana | Given Name | Female |
| 53 | Japanese | CJK | Given Name | Female |
| 54 | Japanese | Latin | Given Name | Female |
| 55 | Japanese | Hiragana | Given Name | Female |
| 56 | Japanese | Katakana | Given Name | Female |
| 57 | Japanese | CJK | Given Name | Ambiguous |
| 58 | Japanese | Latin | Given Name | Ambiguous |
| 59 | Japanese | Hiragana | Given Name | Ambiguous |
| 60 | Japanese | Katakana | Given Name | Ambiguous |
| 61 | Japanese | CJK | Given Name | Ambiguous |
| 62 | Japanese | Latin | Given Name | Ambiguous |
| 63 | Japanese | Hiragana | Given Name | Ambiguous |
| 64 | Japanese | Katakana | Given Name | Ambiguous |
| 65 | Japanese | CJK | Family Name | N/A |
| 66 | Japanese | Latin | Family Name | N/A |
| 67 | Japanese | Hiragana | Family Name | N/A |
| 68 | Japanese | Katakana | Family Name | N/A |
| 69 | Japanese | CJK | Family Name | N/A |
| 70 | Japanese | Latin | Family Name | N/A |
| 71 | Japanese | Hiragana | Family Name | N/A |
| 72 | Japanese | Katakana | Family Name | N/A |

*FIG. 11A*

| ASSOCIATIONS 1130 ||
|---|---|
| ENTRY | ASSOCIATED_ENTRY |
| Haruto | 陽斗 |
| まる | 陽斗 |
| マルと | 陽斗 |
| Sota | 颯太ト |
| そた | 颯太ト |
| ソタ | 颯太ト |
| Yui | 結衣 |
| ゆい | 結衣 |
| ユイ | 結衣 |
| Rio | 莉央 |
| りお | 莉央 |
| リオ | 莉央 |
| Hiro | 寛 |
| ひろ | 寛 |
| ヒロ | 寛 |
| Yuki | 幸 |
| ゆき | 幸 |
| ユキ | 幸 |
| Sato | 佐藤 |
| さと | 佐藤 |
| サト | 佐藤 |
| Suzuki | 鈴木 |
| すづき | 鈴木 |
| スヅキ | 鈴木 |

FIG. 11B

| ENTRIES | |
|---|---|
| ENTRY_ID | ENTRY |
| 73 | Bob |
| 74 | Mike |
| 75 | Sue |
| 76 | Liz |

1210

| CLASSIFICATIONS | | | | |
|---|---|---|---|---|
| ENTRY_ID | ETHNICITY | SCRIPT | PROPERTY | GENDER |
| 73 | English | Latin | Given Name | Male |
| 74 | English | Latin | Given Name | Male |
| 75 | English | Latin | Given Name | Female |
| 76 | English | Latin | Given Name | Female |

1220

| ASSOCIATIONS | |
|---|---|
| ENTRY_ID | ASSOCIATED_ENTRY |
| Bob | Robert |
| Mike | Michael |
| Sue | Susan |
| Liz | Elizabeth |

1230

| FORMS | |
|---|---|
| ENTRY | ENTRY_FORM |
| Bob | Abbreviation |
| Mike | Abbreviation |
| Sue | Abbreviation |
| Liz | Abbreviation |

CLASSIFICATIONS 1320

| ENTRY_ID | ETHNICITY | SCRIPT | PROPERTY | GENDER |
|---|---|---|---|---|
| 78 | English | Latin | Given Name | Ambiguous |
| 78 | English | Latin | Family Name | Ambiguous |
| 79 | English | Latin | Given Name | Ambiguous |
| 79 | English | Latin | Family Name | Ambiguous |
| 80 | English | Latin | Given Name | Ambiguous |
| 80 | English | Latin | Family Name | Ambiguous |

FORMS 1330

| ENTRY | ENTRY_FORM |
|---|---|
| B | Initial |
| H | Initial |
| M | Initial |

ENTRIES 1310

| ENTRY_ID | ENTRY |
|---|---|
| 78 | B |
| 79 | H |
| 80 | M |

ENTRIES (1410)

| ENTRY_ID | ENTRY |
|---|---|
| 81 | Eva Marie |
| 82 | Wilson Moore |
| 83 | Jean Christophe |
| 84 | J C |
| 85 | Karl Heinz |
| 86 | K H |
| 87 | K R S |

CLASSIFICATIONS (1420)

| ENTRY_ID | ETHNICITY | SCRIPT | PROPERTY | GENDER |
|---|---|---|---|---|
| 81 | English | Latin | Given Name | Female |
| 82 | English | Latin | Family Name | Ambiguous |
| 83 | French | Latin | Given Name | Male |
| 84 | French | Latin | Given Name | Ambiguous |
| 85 | German | Latin | Given Name | Male |
| 86 | German | Latin | Given Name | Ambiguous |
| 87 | Hindi | Latin | Given Name | Ambiguous |
| 87 | Dutch | Latin | Given Name | Ambiguous |

OCCURRENCES (1430)

| ENTRY | COUNT |
|---|---|
| Eva Marie | 2 |
| Wilson Moore | 2 |
| Jean Christophe | 2 |
| J C | 2 |
| Karl Heinz | 2 |
| K H | 2 |
| K R S | 3 |

FORMS (1440)

| ENTRY | ENTRY_FORM |
|---|---|
| J C | Initial |
| K H | Initial |
| K R S | Initial |

ENTRIES 1510

| ENTRY_ID | ENTRY |
|---|---|
| 88 | Mr |
| 89 | Ms |
| 90 | Hr |
| 91 | Fr |
| 92 | Dr |
| 93 | Dra |

CLASSIFICATIONS 1520

| ENTRY_ID | ETHNICITY | SCRIPT | PROPERTY | GENDER |
|---|---|---|---|---|
| 88 | English | Latin | Prefix | Male |
| 89 | English | Latin | Prefix | Female |
| 90 | German | Latin | Prefix | Male |
| 91 | German | Latin | Prefix | Female |
| 92 | English | Latin | Prefix | Ambiguous |
| 92 | Spanish | Latin | Prefix | Male |
| 93 | Spanish | Latin | Prefix | Female |

FIG. 16

ENTRIES 1610

| ENTRY_ID | ENTRY |
|---|---|
| 94 | I |
| 95 | II |
| 96 | III |
| 97 | Jr. |
| 98 | Sr. |
| 99 | M D |
| 100 | C P A |

CLASSIFICATIONS 1620

| ENTRY_ID | ETHNICITY | SCRIPT | PROPERTY | GENDER |
|---|---|---|---|---|
| 94 | English | Latin | Suffix | Male |
| 95 | English | Latin | Suffix | Male |
| 96 | English | Latin | Suffix | Male |
| 97 | English | Latin | Suffix | Male |
| 98 | English | Latin | Suffix | Male |
| 99 | English | Latin | Suffix | Ambiguous |
| 100 | English | Latin | Suffix | Ambiguous |

ENTRIES 1710

| ENTRY_ID | ENTRY |
|---|---|
| 101 | Иванович |
| 102 | Ivanovich |
| 103 | Алексеевич |
| 104 | Alexeyevich |
| 105 | Дмитриевна |
| 106 | Dmitrievna |
| 107 | Владимировна |
| 108 | Vladimirovna |

CLASSIFICATIONS 1720

| ENTRY_ID | ETHNICITY | SCRIPT | PROPERTY | GENDER |
|---|---|---|---|---|
| 101 | Russian | Cyrillic | Patronymic | Male |
| 102 | Russian | Latin | Patronymic | Male |
| 103 | Russian | Cyrillic | Patronymic | Male |
| 104 | Russian | Latin | Patronymic | Male |
| 105 | Russian | Cyrillic | Patronymic | Female |
| 106 | Russian | Latin | Patronymic | Female |
| 107 | Russian | Cyrillic | Patronymic | Female |
| 108 | Russian | Latin | Patronymic | Female |

ASSOCIATIONS 1730

| ENTRY | ASSOCIATED_NAME |
|---|---|
| Ivanovich | Иванович |
| Alexeyevich | Алексеевич |
| Dmitrievna | Дмитриевна |
| Vladimirovna | Владимировна |

FORMS 1740

| ENTRY | ENTRY_FORM |
|---|---|
| Иванович | Patronymic |
| Ivanovich | Patronymic |
| Алексеевич | Patronymic |
| Alexeyevich | Patronymic |
| Дмитриевна | Patronymic |
| Dmitrievna | Patronymic |
| Владимировна | Patronymic |
| Vladimirovna | Patronymic |

FIG. 17

ENTRIES — 1810

| ENTRY_ID | ENTRY |
|---|---|
| 109 | President |
| 110 | Presidente |
| 111 | Präsident |
| 112 | Administrator |
| 113 | Administrador |
| 114 | Administradora |
| 115 | CFO |

CLASSIFICATIONS — 1820

| ENTRY_ID | ETHNICITY | SCRIPT | CLASSIFICATION | GENDER |
|---|---|---|---|---|
| 109 | English | Latin | Job Title | Ambiguous |
| 110 | Spanish | Latin | Job Title | Ambiguous |
| 110 | Italian | Latin | Job Title | Ambiguous |
| 111 | German | Latin | Job Title | Ambiguous |
| 112 | English | Latin | Job Title | Ambiguous |
| 113 | Spanish | Latin | Job Title | Male |
| 114 | Spanish | Latin | Job Title | Female |
| 115 | English | Latin | Job Title | Ambiguous |

FORMS — 1830

| ENTRY | ENTRY_FORM |
|---|---|
| CFO | Abbreviation |

FIG. 18

ENTRIES 1910

| ENTRY_ID | ENTRY |
|---|---|
| 116 | Toyota |
| 117 | Granite Construction LLC |
| 118 | Communicaciones Avanzadas SA de CV |

CLASSIFICATIONS 1920

| ENTRY_ID | ETHNICITY | SCRIPT | CLASSIFICATION | GENDER |
|---|---|---|---|---|
| 116 | English | Latin | Organization | Ambiguous |
| 116 | Spanish | Latin | Organization | Ambiguous |
| 116 | Italian | Latin | Organization | Ambiguous |
| 116 | German | Latin | Organization | Ambiguous |
| 116 | Arabic | Latin | Organization | Ambiguous |
| 116 | Hindi | Latin | Organization | Ambiguous |
| 116 | Swedish | Latin | Organization | Ambiguous |
| 116 | Dutch | Latin | Organization | Ambiguous |
| 117 | English | Latin | Organization | Ambiguous |
| 118 | Spanish | Latin | Organization | Ambiguous |

FORMS 1930

| ENTRY | ENTRY_FORM |
|---|---|
| Toyota | Global |
| Granite Construction LLC | Regional |
| Communicaciones Avanzadas SA de CV | Regional |

*FIG. 19*

DATA MASKING NAME DATA

BACKGROUND

Data masking is the practice of obscuring source data while maintaining some identifying characteristics of the source data. Data masking may be applied to source data prior to testing processes or applications which require "actual" source data, in order to alleviate potential privacy concerns. Conventional techniques for data masking include substitution, shuffling, numeric variance, and cloaking.

Substitution involves replaces words, numbers, or character strings with a value of the same type, randomly selected from a list of values of the same type. For example, the given name "John" may be replaced with another given name "Greg". Shuffling replaces words, numbers, or character strings with a value randomly selected from a different record in the same data column. This is similar to the substitution technique except the replacement value is selected from the actual data source instead of from an external list of values.

Numeric variance replaces numbers or dates with a value that is within a specified numeric difference or percentage difference. For example, a sales value "$6,150,239" may be replaced with "$6,148,705", or the birthdate "Feb. 19, 1982" may be replaced with "Dec. 5, 1981". Cloaking replaces a portion (or all) of a data value with a wildcard character. For example, the Social Security Number "481-56-1029" may be replaced with "*--1029", or the credit card number "4081-2625-4900-7216" may be replaced with "XXXX-XXXX-XXXX-7216 ".

The above techniques are often unsuitable to mask name data. Numeric variance only applies to numeric data, and cloaking does not simulate actual data. Substitution and shuffling fail to maintain certain characteristics or relevancy which can be inherent in some name data. This failure breaks the links of data integrity, and processes or applications are unable to thoroughly test all scenarios on thusly-masked data. If such masked data is used in a demonstration to a prospective customer, the masked data may appear odd or inappropriate, thereby discouraging the customer.

BRIEF DESCRIPTION OF THE DRAWINGS

FIG. 4 illustrates determination of ethnicity based on name data according to some embodiments.

FIG. 6 illustrates name data classifications according to some embodiments.

FIG. 7 illustrates name data classifications according to some embodiments.

FIG. 8 illustrates name data classifications according to some embodiments.

FIG. 9 illustrates name data classifications according to some embodiments.

FIG. 10 illustrates name data classifications according to some embodiments.

FIGS. 11A and 11B illustrate name data classifications and associations according to some embodiments.

FIG. 12 illustrates name data classifications, associations and forms according to some embodiments.

FIG. 13 illustrates name data classifications and forms according to some embodiments.

FIG. 14 illustrates name data classifications, occurrences and forms according to some embodiments.

FIG. 15 illustrates name data classifications according to some embodiments.

FIG. 16 illustrates name data classifications according to some embodiments.

FIG. 17 illustrates name data classifications, associations and forms according to some embodiments.

FIG. 18 illustrates name data classifications and forms according to some embodiments.

FIG. 19 illustrates name data classifications and forms according to some embodiments.

DETAILED DESCRIPTION

The following description is provided to enable any person in the art to make and use the described embodiments. Various modifications, however, will remain readily apparent to those in the art.

Some embodiments facilitate the masking of name data by efficiently determining replacement name data which preserves the semantics of the actual name data.

Figure 1:
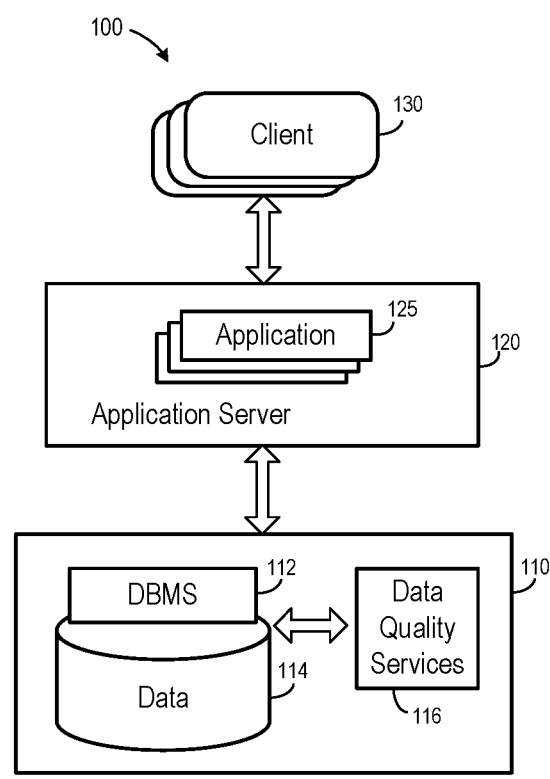
FIG. 1 is a block diagram of a database architecture according to some embodiments.

FIG. 1 is a block diagram of database architecture 100 according to some embodiments. Embodiments are not limited to architecture 100 or to a database architecture. Architecture 100 includes database 110, application server 120 and clients 130.

Application server 120 executes and provides services to applications 125. Applications 125 may comprise server-side executable program code (e.g., compiled code, scripts, etc.) which provide functionality to clients 130 by providing user interfaces to clients 130, receiving requests from clients 130 via such user interfaces, retrieving data from database 110 based on the requests, processing the data received from database 110, and providing the processed data to clients 130. Applications 125 executing within application server 120 may also expose administrative functions to clients 130, including but not limited to data quality services as will be described below. Applications 125 may be made available for execution by application server 120 via registration and/or other procedures which are known in the art.

Application server 120 provides any suitable interfaces through which clients 130 may communicate with applications 125 executing on application server 120. For example, application server 120 may include a HyperText Transfer Protocol (HTTP) interface supporting a transient request/response protocol over Transmission Control Protocol (TCP), a Web Socket interface supporting non-transient full-duplex communications between application server 120 and any clients 130 which implement the WebSocket protocol over a single TCP connection, and/or an Open Data Protocol (OData) interface.

Database 110 comprises database management system (DBMS) 112, data 114 and data quality services 116. One or more applications 125 executing on server 120 may communicate with DBMS 112 using database management interfaces such as, but not limited to, Open Database Connectivity (ODBC) and Java Database Connectivity (JDBC) interfaces. These types of applications 125 may use Structured Query Language (SQL) to manage, modify and query data stored in database 110.

Database 110 may comprise any query-responsive data source or sources that are or become known, including but not limited to a structured-query language (SQL) relational database management system. Database 110 may comprise a relational database, a multi-dimensional database, an eXtendable Markup Language (XML) document, or any other data storage system storing structured and/or unstructured data. Data 114 may be distributed among several relational databases, dimensional databases, and/or other data sources. Embodiments are not limited to any number or types of data sources.

DBMS 112 serves requests to retrieve and/or modify data 114, and also performs administrative and management functions. Such functions may include snapshot and backup management, indexing, optimization, garbage collection, and/or any other database functions that are or become known. Database 110 may also provide application logic, such as database procedures and/or calculations, according to some embodiments. This application logic may comprise scripts, functional libraries and/or compiled program code.

In some embodiments, data 114 may comprise one or more of conventional tabular data, row-based data, column-based data, and object-based data. Data 114 may be indexed and/or selectively replicated in an index to allow fast searching and retrieval thereof. Database 110 may support multi-tenancy to separately support multiple unrelated clients by providing multiple logical database systems which are programmatically isolated from one another.

Data 114 may also store metadata regarding the structure, relationships and meaning of the data stored within data 114. This information may include data defining the schema of database tables stored within data 114. A database table schema may specify the name of the database table, columns of the database table, the data type associated with each column, and other information associated with the database table.

Database 110 may implement an "in-memory" database, in which a full database stored in volatile (e.g., non-disk-based) memory (e.g., Random Access Memory). The full database may be persisted in and/or backed up to fixed disks (not shown). Embodiments are not limited to an in-memory implementation. For example, data may be stored in Random Access Memory (e.g., cache memory for storing recently-used data) and one or more fixed disks (e.g., persistent memory for storing their respective portions of the full database).

Data quality services 116 may comprise functions to selectively process data of data 114. These functions may include, but are not limited to, data masking, data cleansing, data matching, best record identification, semantic profiling and data enrichment functions. These functions may be exposed to applications 125 via the OData protocol, and thereby available to clients 130 for direct initiation or as underlying processes of an algorithm executed by an application 125.

Data 114 may therefore include "raw" data and processed data. For example, data 114 may include records including name data received from one or more sources, and "cleansed" records which are output from a cleansing operation with standardized name data. A cleansing operation may include one or more chained transforms. Generally, a transform generates a set of output records from a set of input records. The input records and the output records may or may not exhibit different schemas. Cleansed records may be subjected to further processing, such as data masking as described herein. Data masking according to some embodiments may utilize other functions provided data quality services 116.

Application server 120 may be separated from or closely integrated with database 110. A closely-integrated application server 120 may enable execution of server applications 125 completely on database 110, without the need for an additional application server. For example, according to some embodiments, database 110 includes a comprehensive set of embedded services which provide end-to-end support for Web-based applications. The services may include a lightweight web server, configurable support for OData, server-side JavaScript execution and access to SQL and SQLScript.

Each of clients 130 may comprise one or more devices executing program code of a software application for presenting user interfaces to allow interaction with application server 120. The user interfaces may comprise user interfaces suited for reporting, data analysis, and/or any other functions based on data 114.

Presentation of a user interface as described herein may comprise any degree or type of rendering, depending on the type of user interface code generated by application server 120. For example, a client 130 may execute a Web Browser to request and receive a Web page (e.g., in HTML format) from application server 120 via HTTP, HTTPS, and/or WebSocket, and may render and present the Web page according to known protocols. One or more of clients 130 may also or alternatively present user interfaces by executing a standalone executable file (e.g., an .exe file) or code (e.g., a JAVA applet) within a virtual machine.

Figure 2:
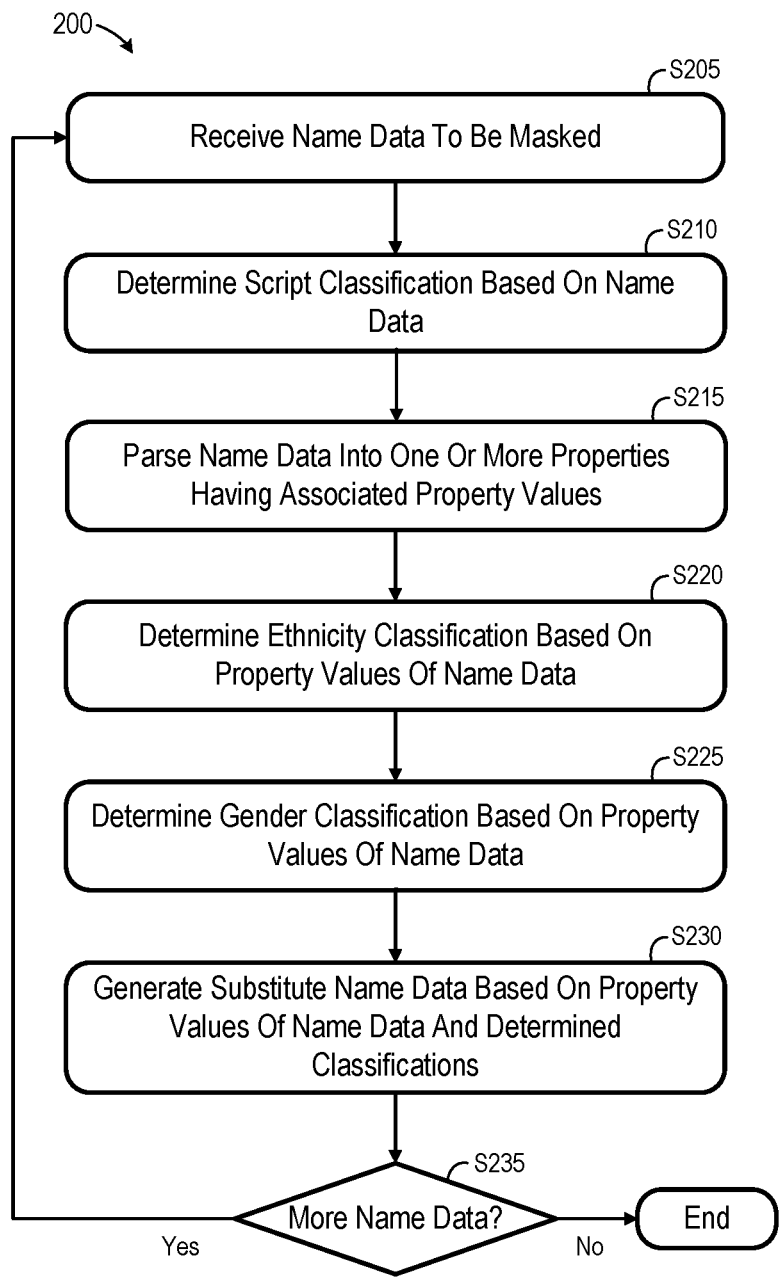
FIG. 2 comprises a flow diagram of a process to determine substitute name data according to some embodiments.

FIG. 2 comprises a flow diagram of process 200 according to some embodiments. Process 200 may comprise a data masking operation according to some embodiments. In some embodiments, various hardware elements of architecture 100 (e.g., one or more processors) execute program code to perform process 200. The program code may be implemented within data quality services 116 according to some embodiments.

Process 200 and all other processes mentioned herein may be embodied in processor-executable program code read from one or more of non-transitory computer-readable media, such as a floppy disk, a disk-based or solid-state hard drive, CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Process 200 may be executed in response to a command received from a user. For example, a client device 130 may access a data preparation application 125 and may present user interfaces thereof. A user may manipulate the user interfaces in order to select a set of records (e.g., all records) of a database table of data 114, and to select a name data masking function. One or more other transforms, such as data validation and data standardization, may be selected for application prior to data masking.

Regardless of how process 200 is initiated, name data to be masked is received at S205. The name data may be received from any source and may include any one or more values. For purposes of the present description, it will be assumed that the received data comprises a record (or a portion of a record) conforming to a schema of a database table, but embodiments are not limited thereto. In this regard, the data received at S205 may be one name data record among several name data records to be masked.

A script classification is determined at S210 based on the name data. Known dictionary-based techniques may be employed at S210 to determine script classification. For example, if the received name data includes only Latin characters, the determined script classification is "latin". If the received name data includes only Cyrillic characters, the determined script classification is "cyrillic". The determined script classification may include more than one script if the received name data includes characters belonging to more than one script (e.g., given name in Greek script and family name in Hebrew script).

Next, at S215, the received name data is parsed into one or more properties having associated property values. The received name data may exhibit any number of formats. For example, the name data may comprise a single full-name attribute (e.g., Name: ROBERT VINCENT HOLTER FREY), two attributes (e.g., Given Name: ROBERT VINCENT; Family Name: HOLTER FREY), three attributes (e.g., Given Name: ROBERT; Middle Name: VINCENT; Last Name: HOLTER FREY), four attributes (e.g., Given Name1: ROBERT; Given Name2: VINCENT; Family Name1: HOLTER; Family Name2: FREY), etc. According to some embodiments, all of the above examples of received name data result in the following parsed name data object after S215:

```
"nameDataMask": {
    "givenName1": "ROBERT",
    "givenName2": "VINCENT",
    "familyName1": "HOLTER",
    "familyName2": "FREY",
    "suffix": "JR"
}
```

Conventional data cleansing techniques may be employed at S215 to parse the name data into properties (e.g., givenName1) and respective property values (e.g., "ROBERT") regardless of the schema of the received name data. Such techniques may employ dictionaries and rules as is known in the art.

An ethnicity classification is determined at S220 based on the property values determined at S215. According to some embodiments, the ethnicity classification is determined by evaluating, for each property, the probability that a property value corresponds to each of one or more languages. Probabilities associated with each language are combined and compared against one another to determine a single language/ethnicity.

Figure 3:
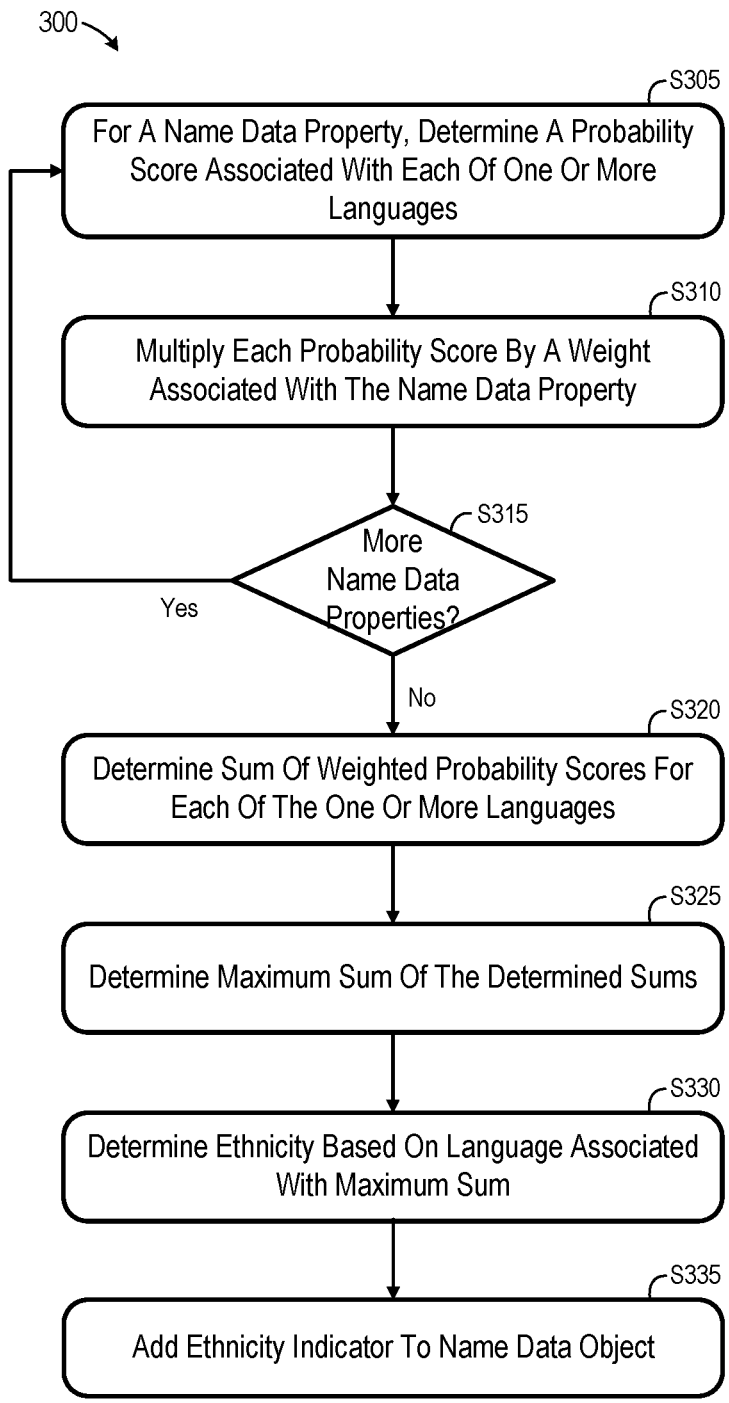
FIG. 3 comprises a flow diagram of a process to determine ethnicity according to some embodiments.

FIG. 3 illustrates process 300 to determine an ethnicity classification at S220 according to some embodiments. Initially, at S305, one or more possible languages are determined for the property value of a name data property, along with an associated probability. FIG. 4 illustrates table 400 including probability scores determined for various property values of the following parsed name data object:

```
"nameDataMask": {
    "givenName1": "RONALD",
    "familyName1": "DUPEY"
}
```

As shown, a probability score of 0.75 is determined for English for the property givenName1 (which is associated with the property value "RONALD"), a probability score of 0.1 is determined for Spanish for the property givenName1, and a probability score of 0.05 is determined for Dutch for the property givenName1. The probability scores may be determined at S305 based on dictionaries and rules as is known in the art.

Each probability score is multiplied by a weight associated with the name data property at S310. In the present example, and as shown in table 400, the name data property givenName1 is associated with a weight of 25%. Accordingly, after S310, the weighted probability scores for the name data property givenName1 are as follows: English=0.1875; Spanish=0.025; Dutch=0.0125.

It is determined at S315 whether additional name data properties of the parsed named data exist. Continuing the present example, flow returns to S305 to determine probabilities associated with the property familyName1. As shown in FIG. 4, the determined probabilities, and their respective languages, are 0.5 for French and 0.1 for English. Again, at S310, each probability score is multiplied by the weight associated with the name data property, which in this example is 15%. The thusly-weighted probability scores for the name data property familyName1 are: French=0.075; English=0.015. Flow then continues from S315 to S320 because the name data object includes no property values of any other properties.

At S320, a sum of the weighted probability scores for each language is determined. Using the above weighted probabilities, the sums determined at S320 are: English=0.2025; Spanish=0.025; Dutch=0.0125; and French=0.075. The maximum sum is determined at S325, and the ethnicity is determined at S330 based on the language associated with the maximum sum. According to the present example, the maximum sum is 0.2025 and the associated language is English. The ethnicity is therefore determined as English at S330. A corresponding ethnicity indicator is added to the name data object at S335.

According to some embodiments, the identified ethnicity is appended as an annotation to the internal object that holds the classified data. The annotation may consist of a two-character language code, for example, "en" for English, "de" for German, "fr" for French, "ar" for Arabic, "fa" for Persian, "hi" for Hindi, "pt" for Portuguese, "jp" for Japanese, etc. In the present example, the annotated object may be as follows:

```
"nameDataMask": {
    "givenName1": "RONALD",
    "familyName1": "DUPEY"
    @<dataMask.person(ethnicity:en)
}
```

The object may also be annotated to reflect the script classification determined at S210 such as:

```
"nameDataMask": {
    "givenName1": "RONALD",
    "familyName1": "DUPEY"
    @<dataMask.person(ethnicity:en)
    @<dataMask.person(script:latin)
}
```

Figure 5:
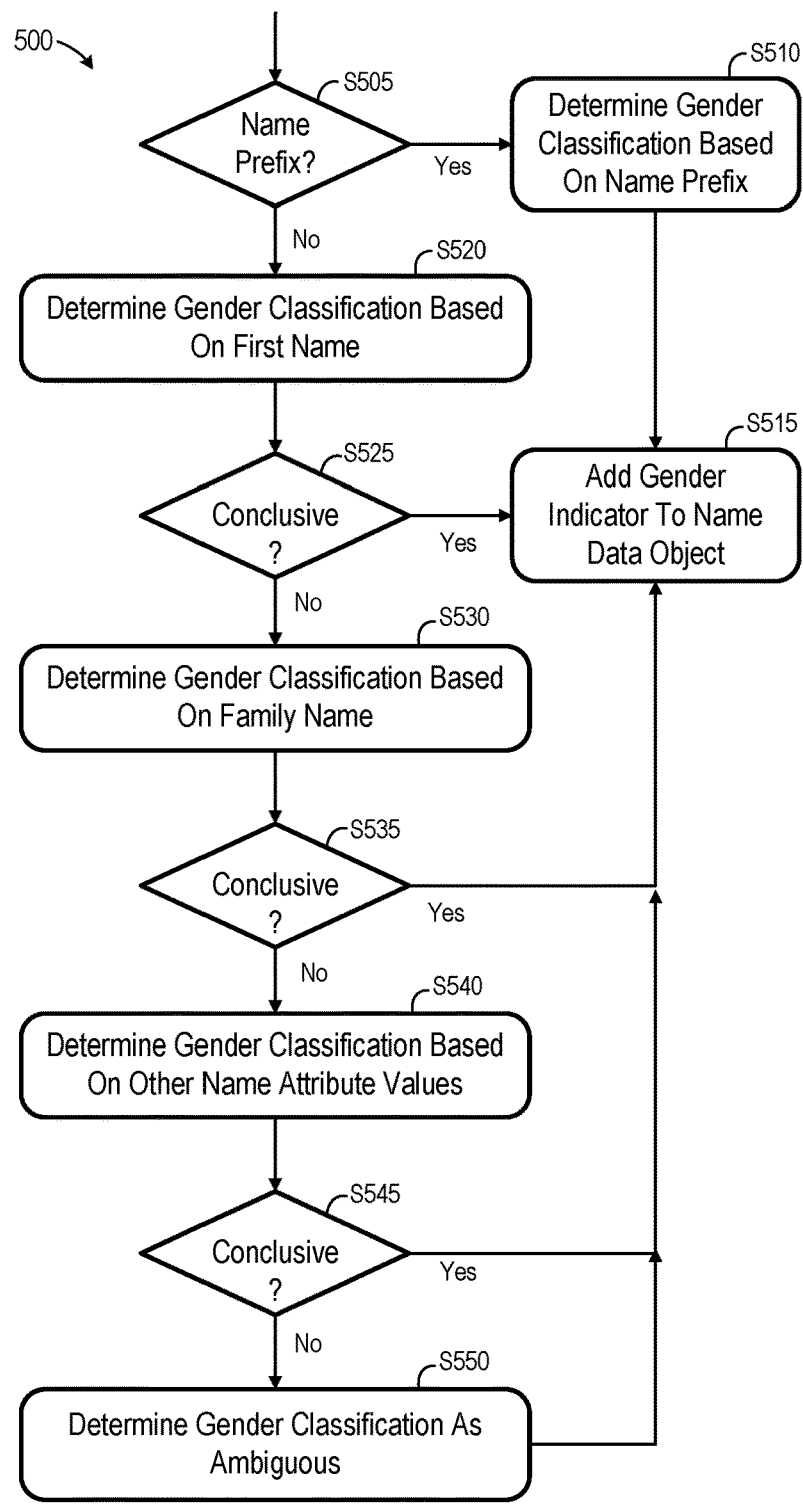
FIG. 5 comprises a flow diagram of a process to determine gender according to some embodiments.

Returning to process 200, a gender classification is determined at S225 based on the property values of the received name data. Process 500 of FIG. 5 provides one example of S225 according to some embodiments. Initially, it is determined whether the name data includes a value for the prefix name property. If so, the gender is determined based on the value of the prefix. For example, prefixes of "Miss", "Mrs." and "Ms." indicate female gender and prefixes of "Mr." and "Master" indicate male gender. Flow proceeds to S515 to add a corresponding gender indicator to the name object, as follows, for example:

```
"nameDataMask": {
    "prefix": "MRS.",
    "givenName1": "ROBERT",
    "familyName1": "HOLTER",
    @<dataMask.person(gender:female)
```

If no value for the prefix property exists, gender classification is determined based on the property value of the givenName1 property. Such a determination might not be conclusive, in the case of ambiguous or unfamiliar first names. It is determined at S525 whether the determination at S520 is conclusive. If so, a gender indicator is added to the name data object at S515 as described above.

```
"nameDataMask": {
    "givenName1": "ROBERT",
    "familyName1": "HOLTER",
    @<dataMask.person(gender:male)
```

If the determination at S520 is not conclusive, gender classification is determined at S530 based on the property value of the familyName1 property. A corresponding gender indicator is added to the name data object at S515 if this determination is conclusive, and flow proceeds from S535 to S540 if it is not.

Gender classification is determined at S540 based on any other existing name property values such as, for example, family name prefixes or name suffixes. Again, flow proceeds to S515 if such a determination is conclusive. If not, the gender classification is determined as ambiguous at S550, and a corresponding indicator is added to the name object at S515.

```
"nameDataMask": {
    "givenName1": "R.",
    "familyName1": "HOLTER",
    @<dataMask.person(gender:ambiguous)
}
```

Again returning to process 200, classifications may be determined for other attributes of one or more properties of the received name data. For example, in Russia it is common to have patronymic names. These names are based on the father's name, with a suffix added to designate whether the person is the son or daughter of the father. An annotation may therefore be added to the name object specifying the classification "patronymic" for a "form" attribute associated with the corresponding property (i.e. givenName2):

```
"nameDataMask": {
    "givenName1":"Алексей",
    "givenName2""Викторович",
    "familyName1" "Иванов",
    @<dataMask.person(ethnicity:ru),
    @<dataMask.person.name.givenName.givenName2(form:patronymic)
}
```

Other classifications of the form attribute may include initials and abbreviations, in which nicknames are classified as abbreviations. The default classification is "expanded", and therefore this classification is used only when a property is initialized or abbreviated.

```
"nameDataMask": {
    "givenName1": "ROBERT",
    "givenName2": "V",
    "familyName1": "HOLTER",
    @<dataMask.person.name.givenName.givenName2(form:initial)
}
"nameDataMask": {
    "givenName1": "K L",
    "familyName1": "SINGH",
    @<dataMask.person.name.givenName.givenName1(form:initial)
}
```

In the following example, "Ma." is an abbreviation for "Maria":

```
"nameDataMask": {
    "givenName1": "MA.",
    "givenName2": "ELISABETH",
    "familyName1": "SÁNCHEZ",
    "familyName2": "CRUZ",
    @<dataMask.person.name.givenName.givenName1(form:abbreviate)
}
```

In this example, "Bob" is recognized as a nickname for "Robert":

```
"nameDataMask": {
    "givenName1": "BOB",
    "familyName1": "HOLTER",
    @<dataMask.person.name.givenName.givenName1(form:abbreviate)
}
```

If a single property value includes multiple occurrences, an occurrences attribute may identify the number of occurrences. The default value (i.e., classification) is 1, and therefore this annotation is used if the number of occurrences is greater than one.

```
"nameDataMask": {
    "givenName1": "JEAN PIERRE",
    "familyName1": "ROUSSEAU",
    @<dataMask.person.name.givenName.givenName1(occurrences:2)
}
"nameDataMask": {
    "givenName1": "A.J.M.",
    "familyName1": "BRUIN",
    @<dataMask.person.name.givenName.givenName1(form:initial occurrences:3)
}
```

This example includes annotations for the form and occurrences attributes, both of which are associated with a same property (i.e., givenName1):

```
"nameDataMask": {
    "givenName1": "JP",
    "familyName1": "ROUSSEAU",
    @<dataMask.person.name.givenName.givenName1(form:initial occurrences:2)
}
```

Other attributes (e.g., char_left, char_right, and char_in) may be used to indicate a string of data which precedes, follows, or exists between name property values. The string is usually punctuation, but may include any string of characters. The default value is one space after each property value, and no spaces before the left-most name property value or after the right-most name property value.

The following example is based on the name Heinz-Karl Lindner, in which a hyphen exists between the two words of the value for property givenName1:

```
"nameDataMask": {
  "givenName1": "HEINZ KARL",
  "familyName1": "LINDNER",
  @<dataMask.person.name.givenName.givenName1(occurrences:2 char_in:"-")
}
```

The name 谢佳羊 exhibits no spaces between property values of givenName1 and familyName1, and may be represented as follows:

```
"nameDataMask": {
  "givenName1": "佳羊",
  "familyName1": "谢",
  @<dataMask.person.name(char_in:"")
}
```

In the example "Carlson, Peter" the family name is listed first and is separated from the given name by a comma:

```
"nameDataMask": {
  "givenName1": "PETER",
  "familyName1": "CARLSON",
  @<dataMask.person.name.familyName(char_right", ")
}
```

Other attributes may be used to identify case. The default value is upper case, and therefore this annotation is used if data is cased differently. Classifications of the case attribute may include mixed, upper and lower.

Example: Mixed case name: Robert V. Holter

```
"nameDataMask": {
  "givenName1": "ROBERT",
  "givenName2": "V",
  "familyName1": "HOLTER",
  @<dataMask.person.name(case:mixed)
}
```

Example: Upper case family name, mixed case other properties: Jean Pierre ROUSSEAU

```
"nameDataMask": {
  "givenName1": "JEAN PIERRE",
  "familyName1": "ROUSSEAU",
  @<dataMask.person.name(case:mixed),
  @<dataMask.person.name.familyName.familyName1(case:upper)
}
```

Continuing with process 200, substitute name data is generated based on the property values of the received name data and on the determined attribute classifications. In some embodiments, the substitute name data is generated based on a name data object including properties, associated property values, and annotations as described above.

For example, it is assumed that the name data "Mark Gartner" was received at S205. The data is parsed into given name "Mark" and family name "Gartner". The script identification routine identifies the data as Latin script, the ethnicity identification routine identifies English as the highest-ranked ethnicity, and the gender identification routine identifies the name as male. The given name "Mark" is a single-word given name that is not flagged as an abbreviation or initial. The full name is found to be mixed case. Accordingly, the following name data object is created:

```
"nameDataMask": {
  "givenName1": "MARK",
  "familyName1": "GARTNER",
  @<dataMask.person(ethnicity:en gender:male script:latin case:mixed)
}
```

Generation of substitute name data at S230 may proceeds as follows. To substitute a name that is similar to "Mark", a name is selected which is an English, Latin script, male given name. The name should be a single-word name, and should not be classified as an initial. For example, "Jack" may be selected as the substitute given name.

To substitute a name that is similar to "Gartner", a name is selected that is classified as an English, Latin script, family name. The name should not be a single-word name, and should not be classified as an initial or an abbreviation. Continuing the example, "Brown" is selected as the substitute family name.

The case annotation value is "mixed", so the standard forms of "Jack" and "Brown" are preserved. The selected name property values are output to the same name properties as their corresponding input property values. For example, if the input data model included two discrete fields for given name and family name, then "Jack" would be output to the given name field and "Brown" to the family name field. However, if the input data model had one name field, then the full "Jack Brown" would be output to that field.

Flow proceeds to S235 to determine whether any name data remains to be masked. If so, flow returns to S205 and continues as described above. If not, process 200 terminates.

Specific implementations of S230 will now be described. These implementations may employ several database tables, including ENTRIES, CLASSIFICATIONS, FORMS, OCCURRENCES and ASSOCIATIONS tables. FIGS. 6-19 illustrates individually-labeled portions of one or more of these tables, rather than distinct instances of the tables.

An ENTRY table contains lists of names that are common to each ethnicity. Each ethnicity has four lists of common names, and each list may include up to a few hundred names. The four lists include: 1-Given names of male gender, 2-Given names of female gender, 3-Given names of ambiguous gender, and 4-Family names.

For illustrative purposes, ENTRIES table 610 of FIG. 6 includes five names of each of the four lists for English ethnicity. ENTRIES table 610 joins to CLASSIFICATIONS table 620 on ENTRY_ID, thereby associating each name of ENTRIES table 610 with an ethnicity, script, property, and gender. CLASSIFICATIONS table 620 contains IDs for each of these four attributes that join with other related tables, but these IDs are omitted for clarity. Tables 710 and 720 show additional rows of the ENTRIES and CLASSIFICATIONS tables, including a similar example of five of names of each of the four lists for French ethnicity.

The names of tables 610 and 710 are stored in mixed case so that names that have special casing such as "O'Leary", "McMahan", and "D'Artagnon" may be substituted as is when the case attribute is mixed, and simply upper-cased when the default upper case is used.

The CLASSIFICATIONS table will include multiple rows for a name if the name is associated with different attribute classifications in different ethnicities. For example, "Robert" is a given name in English locales, and a family name in French locales, as illustrated by tables 810 and 820 of FIG. 8. By including multiple attribute classifications for the same name, "Robert" can be appropriately selected to replace a given name if the ethnicity classification is English, and to replace a family name if the ethnicity classification is French.

In another example, "Jean" is a female name in English locales and a male name in French locales, as illustrated by tables 910 and 920 of FIG. 9. By including multiple attribute classifications for "Jean", the name can be appropriately selected to replace a female given name if the ethnicity classification is English, and to replace a male give name if the ethnicity classification is French.

Due to the way the name data is stored, the same name is not selected as a given name and a family name if that name can be both a given name and a family name in a same ethnicity, for example "John" or "Craig" in English. The data is stored such that these names are in stored in the ENTRIES table only once, but are associated multiple rows in the CLASSIFICATIONS table, one with the English given name classification and another with the English family name classification. When values are selected from the ENTRIES table, the same value is not selected for both the given name and the family name, so it is not possible that a substituted name can be "John John" or "Craig Craig".

For given names that are shared by both males and females, the gender of the substitute name data does not have to match the original name data for the purposes of data masking. Names that are equally shared by both males and females (e.g., "Chris" and "Pat" in English locales) are classified as ambiguous in the CLASSIFICATIONS table, and these names can be substituted with another name of ambiguous gender. For names that are more often used by one gender and yet sometimes used by the other gender (e.g., "Kelly" and "Charlie" in English locales), these names are classified as the more common gender in the CLASSIFICATIONS table. In this regard, "Kelly", that is usually female, and "Erica", that is almost always female, may be substituted for one another.

Family names for most ethnicities are classified as ambiguous gender in the CLASSIFICATIONS table because they do not indicate gender. However, in some ethnicities such as Russian, family names have an associated gender. Therefore, the family names in these ethnicities may be classified as male or female, as illustrated in tables 1010 and 1020 of FIG. 10. By including the gender of these family names, a family name can be selected so that the genders of the given name and family name in the substitute name data match.

Ethnicities that represent names in multiple scripts require each of the four above-mentioned lists for each script. Tables 1110 and 1120 list two of each classification per gender per script for Japanese ethnicity. In this example, the names for Entry_ID 41-44, and each subsequent set of four entries, all represent a same name represented in the four scripts used for name data in Japan. ASSOCIATIONS table 1130 of FIG. 11B associates the four representations as the same name, which allows for appropriate selection when substituting names that are input as multiple scripts for the same name. The ASSOCIATIONS table also includes unshown ID columns as described above with respect to the CLASSIFICATIONS table.

The lists of names in the ENTRIES table may also include abbreviated forms of names. These may be nicknames for an official name such as "Bob" for "Robert" in English locales, or they may be common abbreviations such as "Fco" for "Francisco" in Spanish locales. ENTRIES table 1210 of FIG. 12 illustrates an example of two abbreviated male names and two abbreviated female names in English. ASSOCIATIONS table 1230 associates an abbreviated name with its corresponding expanded name, and is used to prevent a first given name and second given name combination such as "Bill Charles" in which one is a nickname and the other is expanded from inadvertently substituting an undesirable combination such as "Mike Michael". FORMS table 1240 classifies the name as an abbreviated form.

The list of names in the ENTRIES table may also include initialized forms of names, as shown in ENTRIES table 1310 of FIG. 13. Commonly-used initials are included in the ENTRIES table for substitution according to some embodiments. For example, while "X" is possibly used as a name initial in English locales, it is not included because there are not many given names or family names that begin with "X". The initials are classified as initials in FORMS table 1330.

The list of names in the ENTRIES table may also include multiple-word names, including initials, which should be substituted as a unit. As shown in FIG. 14, OCCURRENCES table 1430 identifies how many "words" are included in each name of ENTRIES table 1410 in order to substitute a two-word name with another two-word name, a three-word name with another three-word name, and so on.

The names are stored with a space between attributes, so that the punctuation encountered in the original name can be preserved in the masked name. This allows for relevant substitution of "J. C." as is commonly seen in Hindi locales, "J.C." as is commonly seen in Dutch locales, and "JC" as is commonly seen in French locales. The inclusion or exclusion of punctuation and space is done as a step of standardization after a name is substituted, and is not stored in the lists of names.

Entries table 1510 also includes name prefixes, such as "Mr." and "Ms." (i.e., title prefixes) and "Dr." and "Prof" (i.e., professional prefixes). Entries table 1610 also includes name suffixes, both generational such as "II" or "Jr.", and academic such as "MD" and "CPA".

Patronymics are identified as such in FORMS table 1740 of FIG. 17. ENTRIES table 1710 includes an example of two male patronymic names in Cyrillic and Latin, and two female patronymic names in Cyrillic and Latin, and CLASSIFICATIONS table 1720 illustrates their classifications. In this example, the names of Entry_IDs 101-102, and each subsequent pair of rows, represent the same name represented in the two scripts used for name data in Russia.

The example of S230 provided above will now be described with respect to the above-described tables. Again, the following input name data is assumed:

```
"nameDataMask": {
  "givenName1": "MARK",
  "familyName1": "GARTNER",
  @<dataMask.person(ethnicity:en gender:male script:latin case:mixed)
}
```

To determine a substitute given name that is similar to "Mark", a name is selected from ENTRIES 610 table which is classified in CLASSIFICATIONS table 620 as an English, Latin script, male given name. The name should not exist in the OCCURRENCES table in order to select a single-word name, and should not exist in the FORMS table classified as an initial. Of the names fitting the above criteria, "Jack" is randomly selected as the substitute given name.

To determine a substitute family name that is similar to "Gartner", a name is selected from the ENTRIES table that is classified as an English, Latin script, family name from the CLASSIFICATIONS table. The name should not exist in the OCCURRENCES table, in order to select a single-word name, and should not exist in the FORMS table. "Brown" is randomly-selected as the substitute family name.

The case annotation value is "mixed", so the standard forms of "Jack" and "Brown" are preserved as-is from the name list in the ENTRIES table. The determined property values of the substitute name data are output to the attributes from which the corresponding properties were found in the input. For example, if the input data model included two discrete fields for given name and family name, then "Jack" would be output to the given name field and "Brown" to the family name field. However, if the input data model included a single name field, then the full "Jack Brown" would be output to that field.

In another example, the name data received at S205 is "Emma Bertrand". The data is parsed into given name "Emma" and family name "Bertrand". The script identification routine identifies the data as Latin script, the ethnicity identification routine identifies French as the highest ranked ethnicity, and the gender identification routine identifies the name as female. The given name "Emma" is a single-word given name that is not flagged as an abbreviation or initial. The full name is found to be mixed case. The annotated name data object is as follows:

```
"nameDataMask": {
  "givenName1": "EMMA",
  "familyName1": "BERTRAND",
  @<dataMask.person(ethnicity:fr gender:female script:latin case:mixed)
}
```

Names with similar classifications are randomly selected as described in the previous example, but with French ethnicity. "Chloé" is randomly selected as a given name substitution for "Emma", and "Martin" is randomly selected as a family name substitution for "Bertrand".

It is now assumed that the name data "Dominique Johnson" is received at S205. The data is parsed into given name "Dominique" and family name "Johnson". The ethnicity identification routine computes high scoring ranks for French with regard to "Dominique" and English with regard to "Johnson", but French is ranked as the highest because the computation attributes a greater weight to the given name. As a result, the ethnicity of the name as a whole is determined to be French. The gender identification routine identifies the name as ambiguous gender because in French locales "Dominique" is used for both males and females, resulting in the following annotated name data object:

```
"nameDataMask": {
  "givenName1": "DOMINIQUE",
  "familyName1": "JOHNSON",
  @<dataMask.person(ethnicity:fr gender:ambiguous script:latin case:mixed)
}
```

To determine a substitute name that is similar to "Dominique", a name is selected from the ENTRIES table that is classified as a French, Latin script, ambiguous-gender given name from the CLASSIFICATIONS table. "Claude" is randomly selected as the substitute given name. To obtain a family name to substitute in place of "Johnson", a name is selected from the ENTRIES table that is classified as a French, Latin script, family name from the CLASSIFICATIONS table. "Robert" is randomly selected as the substitute family name.

A French family name is selected even though the input family name commonly appears in English locales. This is because the ethnicity classification is applied to the person name as a whole, not to individual name properties. Substitution in this manner results in name data masking that preserves ethnic semantics.

Applying the ethnicity classification to the name as a whole also prevents unexpected combinations in a substitute name. For example, such application prevents inadvertent selection of the same name when that name can be a given name in one ethnicity and a family name in another ethnicity, such as "Robert Robert" (English/French) or "Anderson Anderson" (Portuguese/English).

Assuming the input name data "José Maria Cruz", the data is parsed into given name 1 "José", given name 2 "Maria", and family name "Cruz". The script identification routine identifies the data as Latin script, and the ethnicity identification routine identifies Spanish as the highest ranked ethnicity. The gender identification routine identifies the given name 1 as male and given name 2 as female, but the gender is determined to be male because the gender computation attributes a greater weight to the first given name.

```
"nameDataMask": {
  "givenName1": "JOSÉ",
  "givenName2": "MARIA",
  "familyName1": "CRUZ",
  @<dataMask.person(ethnicity:es gender:male script:latin case:mixed)
}
```

To substitute a name that is similar to "José Maria", two names are selected from the ENTRIES table that are classified as Spanish, Latin script, male given names from the CLASSIFICATIONS table. "Diego" is randomly selected as the substituted given name 1, and "Antonio" is randomly selected as the substituted given name 2.

A male given name 2 is selected even though the gender of the input name is female, because the gender attribute is applied to the person name as a whole, not to individual name properties. This application results in name data masking that is ethnically relevant. Applying the gender attribute to the name as a whole also prevents unexpected combinations in a substituted name. For example, it is acceptable in Spanish locales to combine the male/female combination of "José" and "Maria", but it is unacceptable to combine any combination of mixed gender names.

The following examples illustrate generation of substitute name data while preserving the input script.

The Japanese Kanji name 鈴木陽斗 is parsed into given name "陽斗" and family name "鈴木". The script identification routine identifies the data as CJK script, the ethnicity identification routine identifies Japanese as the highest ranked ethnicity, and the gender identification routine identifies the name as male. The full name does not include a space or any separator between the family name and the given name.

```
"nameDataMask": {
    "givenName1": "陽斗",
    "familyName1": "鈴木",
    @<dataMask.person(ethnicity:ja gender:male script:cjk char_in:"")
}
```

To substitute a name that is similar to "陽斗", a name is selected from the ENTRIES table that is classified as a Japanese, CJK script, male given name from the CLASSIFICATIONS table. "颯太ト" is randomly selected as the substituted given name. To substitute a name that is similar to "鈴木", a name is selected from the ENTRIES table that is classified as a Japanese, CJK script, family name from the CLASSIFICATIONS table. "佐藤" is randomly selected as the substituted family name.

As above, the substitute name data is output to the data model components from which the corresponding parsed properties were found in the input. For example, if the input data model had two discrete fields for family name and given name, then "佐藤" would be output to the family name field and "颯太ト" to the given name field. However, if the input data model had one name field, then the full "佐藤颯太ト" would be output to that field, without a space or any separator between the family name and given name.

The Korean Hangul name 김은주 may be parsed into given name "은주" and family name "김". The script identification routine identifies the data as Hangul script, the ethnicity identification routine identifies Korean as the highest ranked ethnicity, and the gender identification routine identifies the name as female. The full name does not include a space or any separator between the family name and the given name.

```
"nameDataMask": {
    "givenName1": "은주",
    "familyName1": "김",
    @<dataMask.person(ethnicity:ko gender:female script:hangul
    char_in:"")
}
```

Names with similar classifications are selected as described in the previous example, but with Korean ethnicity, female gender, and Hangul script. "미경" is randomly selected as a given name substitution for "은주" and "이" is randomly selected as a family name substitution for "김". If output to a full name field, then the family name and given name are combined without a space or separator between.

The Russian Cyrillic name Алексей Викторович Иванов may be parsed into given name "Алексей", patronymic "Викторович", and family name "Иванов". The script identification routine identifies the data as Cyrillic script, the ethnicity identification routine identifies Russian as the highest ranked ethnicity, and the gender identification routine identifies the name as male.

```
"nameDataMask": {
    "givenName1": "АЛЕКСЕЙ",
    "givenName2": "ВИКТОРОВИЧ",
    "familyName1": "ИВАНОВ",
    @<dataMask.person(ethnicity:ru gender:male script:cyrillic case:mixed),
    @<dataMask.person.name.givenName.givenName2(form:patronymic)
}
```

Names with similar classifications are selected as substitute given and family names as described in the previous example, but with Russian ethnicity and Cyrillic script. "Николай" is randomly selected as a given name substitution for "Алексей", and "Васильев" is randomly selected as a family name substitution for "Иванов".

The second given name is annotated as exhibiting the patronymic form. A substitute second given name is selected from the ENTRIES table that is classified as a Russian, Cyrillic script, male given name from the CLASSIFICATIONS table, and is classified as a patronymic in the FORMS table. "Иммануилович" is randomly selected as the substituted patronymic.

In contrast, Ekaterina Nikolayevna Savinkova is a Russian name with patronymic that is input in Latin script. This name data is parsed into given name, patronymic, and family name just as the Cyrillic name, but the script is identified as Latin.

```
"nameDataMask": {
    "givenName1": "EKATERINA",
    "givenName2": "NIKOLAYEVNA",
    "familyName2": "SAVINKOVA",
    @<dataMask.person(ethnicity:ru gender:female script:latin case:mixed),
    @<dataMask.person.name.givenName.givenName2(form:patronymic)
}
```

Substitute names are selected as described above but where classified with Latin script. "Yulia" is randomly selected as a given name substitution for "Ekaterina", "Viktorovna" is randomly selected as a female patronymic substitution for "Nikolayevna", and "Alexandrova" is randomly selected as a family name substitution for "Savinkova".

The following examples illustrate how substitute name data is generated for initials and nicknames.

The data "Mark T. Gartner" is parsed into given name 1 "Mark", given name 2 "T.", and family name "Gartner". The script identification routine identifies the data as Latin script, the ethnicity identification routine identifies English as the highest ranked ethnicity, and the gender identification routine identifies the name as male. The second given name "T." is flagged as an initial, and identified as containing a following period, resulting in the following annotated name data object:

```
"nameDataMask": {
    "givenName1": "MARK",
    "givenName2": "T",
    "familyName1": "GARTNER",
    @<dataMask.person(ethnicity:en gender:male script:latin case:mixed)
    @<dataMask.person.givenName.givenName2(form:initial char_right:".")
}
```

Substitute values for given name 1 and family name are selected as described previously. That is, "Jack" is selected as a given name substitution for "Mark", and "Brown" is selected as a family name substitution for "Gartner". To substitute for the initial "T.", a name is selected from the ENTRIES table that is classified as an English, Latin script name from the CLASSIFICATIONS table, and that is classified as an initial in the FORMS table. The name should not exist in the OCCURRENCES table, in order to select a single initial. "L" is selected as the substituted given name 2 initial. The char_right annotation value of a period standardizes the output form of the initial to "L."

Input name data "Angie Carpenter" is parsed into given name "Angie" and family name "Carpenter". The script identification routine identifies the data as Latin script, the ethnicity identification routine identifies English as the highest ranked ethnicity, and the gender identification routine identifies the name as female. The given name "Angie" is flagged as an abbreviation.

```
"nameDataMask": {
    "givenName1": "ANGIE",
    "familyName1": "CARPENTER",
    @<dataMask.person(ethnicity:en gender:female script:latin case:mixed)
    @<dataMask.person.name.givenName.givenName1(form:abbreviate)
}
```

To substitute for the nickname "Angie", a name is selected from the ENTRIES table that is classified as an English, Latin script, female given name from the CLASSIFICATIONS table, and that is classified as an abbreviation in the FORMS table. The name should not exist in the OCCURRENCES table in order to select a single name. "Patti" is randomly selected as the substituted nickname.

In another example, the name data "Molly-Anne Connors" is parsed into given name "Molly-Anne" and family name "Connors". The script identification routine identifies the data as Latin script, the ethnicity identification routine identifies English as the highest ranked ethnicity, and the gender identification routine identifies the name as female. The compound given name "Molly-Anne" is flagged as a two-word given name with a hyphen between and annotated as follows:

```
"nameDataMask": {
    "givenName1": "MOLLY ANNE",
    "familyName1": "CONNORS",
    @<dataMask.person(ethnicity:en gender:female script:latin case:mixed)
    @<dataMask.person.name.givenName.givenName1(occurrences:2 char_in:"-")
}
```

To substitute a name that is similar to "Molly-Anne", a name is selected from the ENTRIES table that is classified as an English, Latin script, female given name from the CLASSIFICATIONS table, and is associated with "2" in the OCCURRENCES table. The name should not exist in the FORMS table. "Eva Marie" is randomly selected as the substituted given name. The data is standardized to mixed case. Due to the hyphen in the char_in annotation, a hyphen is inserted between the two words. The result is that "Eva-Marie" is substituted for "Molly-Anne".

The name data "M.K.R. Subramani" is parsed into given name "M.K.R." and family name "Subramani". The script identification routine identifies the data as Latin script, the ethnicity identification routine identifies Hindi as the highest ranked ethnicity, and the gender identification routine identifies the name as ambiguous. The multiple-initialized given name "M.K.R." is flagged as a three-word initialized given name with a period and no space between.

```
"nameDataMask": {
    "givenName1": "M K R",
    "familyName1": "SUBRAMANI",
    @<dataMask.person(ethnicity:hi gender:ambiguous script:latin case:mixed)
    @<dataMask.person.name.givenName.givenName1(occurrences:3 form:initial char_in:"." char_right:".")
}
```

To substitute a name that is similar to "M.K.R.", a name is selected from the ENTRIES table that is classified as a Hindi, Latin script, ambiguous given name from the CLASSIFICATIONS table, that is classified as an initial in the FORMS table, and that is associated with "3" in the OCCURRENCES table. "K R S" is randomly selected as the substituted given name. Due to the period without space as the char_in and char_right annotations, the result is that "K.R.S." is substituted for "M.K.R."

If the initials included a period and a space between (M. K. R. Subramani), the char_in annotation value would be ". " (period with a space) and the char_right annotation value would remain "." (period without space) (i.e., @<dataMask.person.name.givenName.givenName1(char_in:". " char_ right:".")) Once "K R S" is selected, it would be standardized to "K. R. S." as the substituted given name.

In the case of a compound initialized given name such as "JC Bernard" a common practice in French locales is considered where a compound name like "Jean-Christophe" is initialized to "JC" without any separator, and "Jean-Pierre" is initialized to "JP". Since this is such a common practice, the data parsing treats this kind of name as a two-word initialized given name, and these names are stored in the ENTRIES table with occurrence of "2" the same as initials.

The "JC" is parsed into given name "J C", and flagged as a two-word initialized given name with no separator between.

```
"nameDataMask": {
    "givenName1": "J C",
    "familyName1": "BERNARD",
    @<dataMask.person(ethnicity:fr gender:ambiguous script:latin case:mixed)
    @<dataMask.person.name.givenName.givenName1(occurrences:2 form:initial char_in:"")
}
```

To substitute a name that is similar to "JC", a name is selected from the ENTRIES table that is classified as a French, Latin script, ambiguous given name from the CLASSIFICATIONS table, that is classified as an initial in the FORMS table, and that has "2" in the OCCURRENCES table. "J P" is randomly selected as the substitute given name. Due to the char_in annotation value of a blank string, the result is that "JP" is substituted for "JC".

In the case of a compound family name such as "Kate Peterson-Adams", the data is parsed into given name "Kate", family name 1 "Peterson", and family name 2 "Adams". The script identification routine identifies the data as Latin script, the ethnicity identification routine identifies English as the highest ranked ethnicity, and the gender identification routine identifies the name as female. The compound family name is parsed as two independent family names, and the annotations indicate a hyphen between the two.

```
"nameDataMask": {
  "givenName1": "KATE",
  "familyName1": "PETERSON",
  "familyName2": "ADAMS",
  @<dataMask.person(ethnicity:en gender:female script:latin case:mixed)
  @<dataMask.person.name.givenName.givenName1(form:abbreviation)
  @<dataMask.person.name.familyName(char_in:"-")
}
```

"Maddie" is randomly selected as the substituted given name as described above in the nickname example. The family name is treated as a substitution of two single-word English, Latin-script, family names. "Wilson" is randomly selected as a substitution for "Peterson", and "Moore" is randomly selected as a substitution for "Adams". The data is standardized to mixed case. Due to the hyphen of the char_in annotation, a hyphen is inserted between the two words. The result is that "Wilson-Moore" is substituted for "Peterson-Adams".

There are cases in which a source of person name data also includes job title data. To protect the identity of people, name data masking should also include masking of the job title data.

Therefore, in some embodiments the ENTRIES table contains a list of common job titles for each ethnicity, as shown in ENTRIES table 1810 of FIG. 18. The professions in this list are job titles that span multiple industries, in order to make the substitute job title appear to be as real as possible. The same CLASSIFICATIONS and FORMS tables 1820 and 1830 are shared between names and job titles.

In some cases a single job title, such as "Presidente", is associated with multiple rows in the CLASSIFICATIONS table because it is spelled the same way in multiple ethnicities. A job title may also indicate gender, such as the Spanish "Administrador" for male administrators and "Administradora" for female administrators. Abbreviated titles, such as "CFO" for "Chief Financial Officer", are classified as abbreviations in FORMS table 1830.

If the input data includes only a job title, such as "Marketing Director", the full contents are parsed as a job title. The script identification routine identifies the data as Latin script, the ethnicity identification routine identifies English as the highest ranked ethnicity, the gender identification routine identifies the job title as ambiguous gender, and the job title is found to be mixed case. The resulting name data object may be as follows:

```
"nameDataMask": {
  "jobTitle": "MARKETING DIRECTOR",
  @<dataMask.person.jobTitle(ethnicity:en gender:ambiguous script:latin case:mixed)
}
```

To generate a substitute job title that is similar to "Marketing Director", a value is selected from the ENTRIES table that is classified in the CLASSIFICATIONS table as an English, Latin script, ambiguous-gender job title. The job title should not be classified as an abbreviation in the FORMS table. "Sales Representative" is randomly selected as the substituted job title. The case annotation value is "mixed", so the standard form of "Sales Representative" is preserved from the entries list. The substitute value is output to the input model attribute from which the parsed component was received.

In the case of a job title indicating gender, such as "Administradora", the full contents of the input attribute are parsed as a job title. The script identification routine identifies the data as Latin script, the ethnicity identification routine identifies Spanish as the highest ranked ethnicity, the gender identification routine identifies the job title as female, and the job title is found to be mixed case.

```
"nameDataMask": {
  "jobTitle": "ADMINISTRADORA",
  @<dataMask.person.jobTitle(ethnicity:es gender:female script:latin case:mixed)
}
```

The substitute value for this job title is the same as the previous example, with the exception that another female job title is selected. "Gerenta de Operaciones" is randomly selected as the substituted female job title.

For an abbreviated job title, such as "CFO", the full contents of the input attribute are parsed as a job title. The script identification routine identifies the data as Latin script, the ethnicity identification routine identifies English as the highest ranked ethnicity, and the gender identification routine identifies the job title as ambiguous gender. The job title is found to be in an abbreviated form and the resulting annotated name data object is:

```
"nameDataMask": {
  "jobTitle": "CFO",
  @<dataMask.person.jobTitle(ethnicity:en gender:ambiguous script:latin form:abbreviate)
}
```

To substitute a job title that is similar to "CFO", a value is selected from the ENTRIES table that is classified as an English, Latin script, ambiguous-gender job title from the CLASSIFICATIONS table, and is classified as an abbreviation in the FORMS table. "VP" is randomly selected as the substituted job title.

According to another example, the input data "Mark Gartner, Product Manager" may be parsed into given name "Mark", family name "Gartner", and job title "Product Manager". The script identification routine identifies the data as Latin script, the ethnicity identification routine identifies English as the highest ranked ethnicity, and the gender identification routine identifies the name as male. The char_right annotation identifies that the person name and title are separated by a comma and a space.

```
"nameDataMask": {
  "givenName1": "MARK",
  "familyName1": "GARTNER",
  "jobTitle": "PRODUCT MANAGER",
  @<dataMask.person(ethnicity:en gender:male script:latin case:mixed)
  @<dataMask.person.name(char_right:", ")
}
```

The process for determining a substitute name is the same as described in the examples above. "Jack" is randomly selected as the substituted given name, and "Brown" as the substituted family name. Similarly, the process for determining a substitute job title is the same as described in the previous job title examples. "Operations Director" is randomly selected as the substituted job title. Since the name and job title were found in the same input attribute, the substitute vales are output to the same attribute, in mixed case form and with a comma and a space inserted between the name and the job title.

The ethnicity of the job title may be different than the ethnicity of the person name. This should be seen as a normal occurrence, because it is not unusual for a person of Chinese ethnicity to live in the United States and have a job title in English, or for a person of Italian ethnicity to live in Brazil and have a job title in Brazil, etc. In such instances, the internal object that holds the input data specifies one ethnicity for the name and another for the job title, and generation of corresponding substitute values take the ethnicity of these components into account separately.

As shown in FIG. 19, ENTRIES table 1910 may contain a list of organization names for each ethnicity. There are two types of names in this table. One is a list of global enterprises that are commonly-known by one name (e.g., Toyota) in many countries throughout the world. This type of organization name appears once in the ENTRIES table, and multiple times in the CLASSIFICATIONS table, once for each ethnicity classification.

Table 1910 also shows examples of fictitious regional organization names that are unique within an ethnicity. Both of type of organizations are classified in CLASSIFICATIONS table 1920 as organizations, but they are distinguished in FORMS table 1930 as either global or regional.

In the case of an organization name (e.g., "Apple"), the full contents of the input attribute are parsed as an organization. The script identification routine identifies the data as Latin script, the ethnicity identification routine identifies English as the highest-ranked ethnicity, the gender identification routine identifies the organization as ambiguous gender, and the organization name is found to be mixed case. The organization name is flagged in the list of names as a global organization.

```
"nameDataMask": {
   "organization": "APPLE",
   @<dataMask.organization(ethnicity:en gender:ambiguous script:latin
      form:global case:mixed)
}
```

To substitute an organization name that is similar to "Apple", a value is selected from the ENTRIES table that is classified as an English, Latin script, and organization from the CLASSIFICATIONS table, and classified as global from the FORMS table. "Hewlett-Packard" is randomly selected as the substituted organization. The case annotation value is "mixed", so the standard form of "Hewlett-Packard" is preserved.

In the case of small organizations (e.g., "Eastern Tennessee Technical College"), the full contents of the input attribute are parsed as an organization. The script identification routine identifies the data as Latin script, the ethnicity identification routine identifies English as the highest ranked ethnicity, the gender identification routine determines ambiguous gender, and the organization name is found to be mixed case. The organization name is flagged in the list of names as a regional organization.

```
"nameDataMask": {
   "globalOrganization": "EASTERN TENNESSEE
   TECHNICAL COLLEGE",
   @<dataMask.organization(ethnicity:en gender:ambiguous script:latin
      form regional case:mixed)
}
```

Determination of the substitute organization name is the same as the previous example, with the exception that an entry is selected that is classified as a regional organization. "Allen Insurance Group" is randomly selected as the substituted organization.

According to some embodiments, user settings are exposed to enable a degree of user control over the determination of substitute data. These settings primarily override the above-described default behavior.

In some situations, identifying the gender of a person name and substituting a name of the same gender does not hide the identity of an individual. For example, if all but one of a group of input names are of a same gender, then the substitute group of names will also consist of all but one of a same gender. Some embodiments therefore allow a user to select the gender substitution process as described above or a process in which gender is not considered (i.e., suppressed) in the determination of substitute data.

Similar situations may arise with regard to ethnicity. Three options are provided with respect to the use of ethnicity in determining substitute name data. According to these options, ethnicity information may be utilized as described above, ethnicity identification may be ignored (i.e., suppressed) in the determination of substitute data, or the user may select either one ethnicity or a subset of ethnicities to choose from during the determination of substitute data.

User settings related to script classification may specify the above default behavior, in which a script is identified and substitute name data conforms to the identified script. Alternatively, a user setting may specify suppression of script classification, in which case the user selects a script from which substitute name data is to be selected.

In some embodiments, a user setting controls the manner in which non-name data (e.g., prefixes, suffixes, job titles, and any other extraneous data) is considered during the determination of substitute data. The setting may specify the default behavior described above, a behavior in which substitutes are determined for name data but any non-name data is passed through without change, or a behavior in which substitutes are determined for name data but any non-name data is ignored so that the masked output contains only name data.

Figure 20:
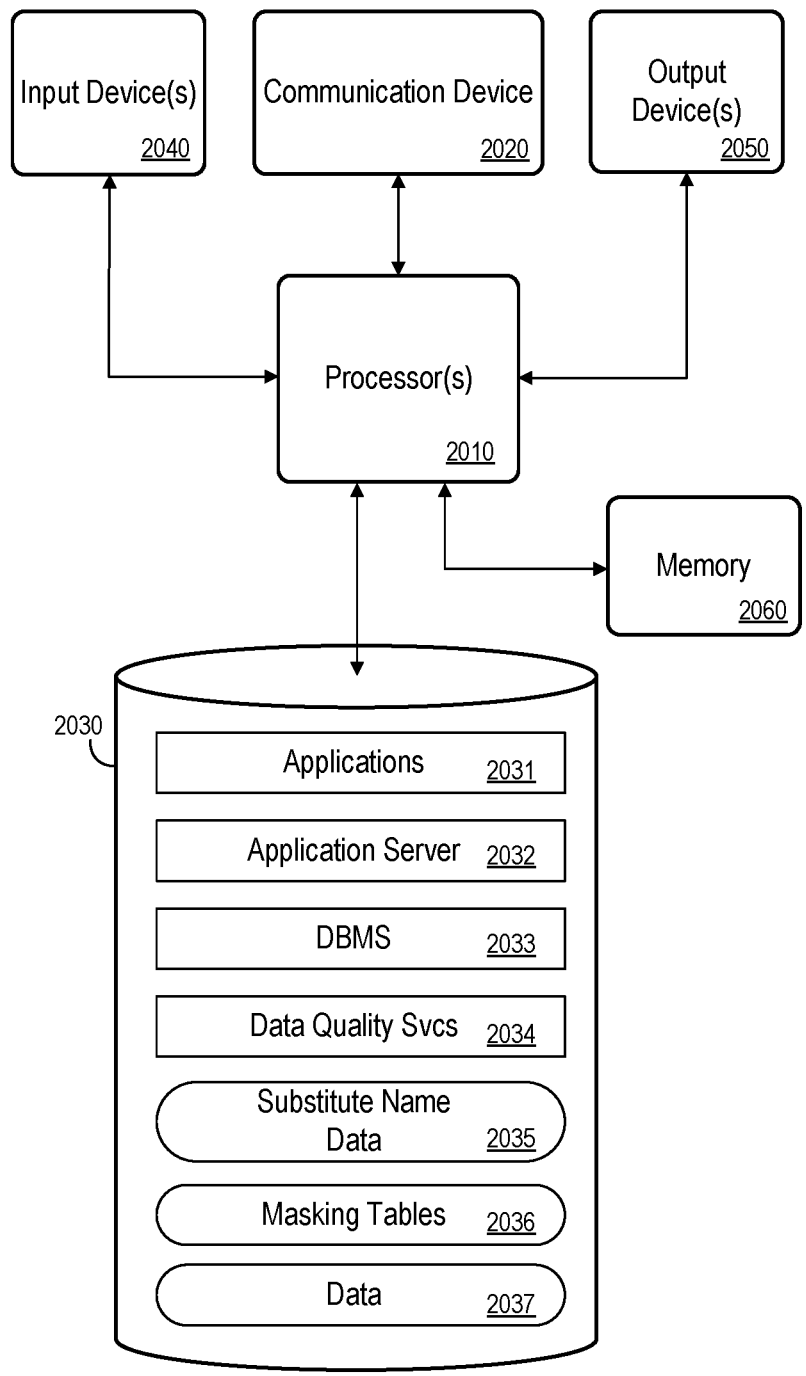
FIG. 20 is a block diagram of an apparatus according to some embodiments.

FIG. 20 is a block diagram of apparatus 2000 according to some embodiments. Apparatus 2000 may comprise a general-purpose computing apparatus and may execute program code to perform any of the functions described herein. According to some embodiments, apparatus 2000 may comprise an implementation of database 110 and application server 130 of FIG. 1. Apparatus 2000 may include other unshown elements.

Apparatus 2000 includes processor 2010 operatively coupled to communication device 2020, data storage device 2030, one or more input devices 2040, one or more output devices 2050 and memory 2060. Communication device 2020 may facilitate communication with external devices, such as a client, or an external data storage device. Input device(s) 2040 may comprise, for example, a keyboard, a keypad, a mouse or other pointing device, a microphone, knob or a switch, an infra-red (IR) port, a docking station, and/or a touch screen. Input device(s) 2040 may be used, for example, to enter information into apparatus 2000. Output device(s) 2050 may comprise, for example, a display (e.g., a display screen) a speaker, and/or a printer.

Data storage device 2030 may comprise any appropriate persistent storage device, including combinations of magnetic storage devices (e.g., magnetic tape, hard disk drives and flash memory), optical storage devices, Read Only Memory (ROM) devices, etc., while memory 2060 may comprise Random Access Memory (RAM), Storage Class Memory (SCM) or any other fast-access memory.

Applications 2031, application server 2032, DBMS 2033 and data quality services 2034 may comprise program code executed by processor 2010 to cause apparatus 2000 to perform any one or more of the processes described herein. Embodiments are not limited to execution of these processes by a single apparatus.

Substitute name data 2035 may comprise name data generated as described herein, and masking tables 2036 may comprise the above-described ENTRIES, CLASSIFICATIONS, ASSOCIATIONS, FORMS, and OCCURRENCES tables. Data 2037 may comprise database tables storing data for one or more applications 2031, warehoused data, and/or any other data desired to be stored.

Substitute name data 2035, masking tables 2036 and data 2037 (either cached or a full database thereof) may be stored in device 2030 as shown and/or in volatile memory such as memory 2060. Data storage device 2030 may also store data and other program code for providing additional functionality and/or which are necessary for operation of apparatus 2000, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation of a system according to some embodiments may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
a database system storing a plurality of name data records;
a data cleansing system storing a plurality of tables associating name values with a plurality of attribute classifications, the data cleansing system to:
receive a name data record including name data;
for each of a plurality of name properties, determine an associated value based on the name data;
determine a gender classification based on the determined values;
for each value, generate a substitute property value based on the name property associated with the value, the gender classification, and the plurality of tables, wherein generation of the substitute property value comprises generation of a substitute property value based on the name property associated with the value, the gender classification, the plurality of tables, and an ethnicity classification; and
determine the ethnicity classification based on the values by:
determining, for each name property, one or more languages associated with the value of the name property and a probability score associated with each of the one or more languages;
determining a sum of the probability score associated with each of two or more languages;
determining a maximum sum of the determined sum; and
determining the ethnicity classification based on the language associated with the maximum sum.

2. A system comprising:
a memory storing processor-executable process steps; and
a processor to execute the processor-executable process steps to cause the system to:
receive name data;
for each of a plurality of name properties, determine an associated property value based on the name data;
determine a gender classification based on the property values;
for each property value, generate a substitute property value based on the name property associated with the property value and the gender classification, wherein generation of the substitute property value comprises generation of a substitute property value based on the name property associated with the value, the gender classification and an ethnicity classification; and
determine the ethnicity classification based on the property values by:
determining, for each name property, one or more languages associated with the value of the name property and a probability score associated with each of the one or more languages;
determining a sum of the probability score associated with each of the two or more languages;
determining a maximum sum of the determined sum; and
determining the ethnicity classification based on the language associated with the maximum sum.

3. A system according to claim 2, wherein determination of the gender classification comprises:
determination of whether the name properties include a name suffix property; and
if it is determined that the name properties include a name suffix property, determination of the gender classification based on the property value of the name suffix property.

4. A system according to claim 2, wherein the probability score determined for a name property is weighted based on a predetermined weight corresponding to the name property, the predetermined weights corresponding to at least two name properties being different and non-zero.

5. A system according to claim 2, wherein
determination of the gender classification comprises:
determination of whether the name properties include a name suffix property; and
if it is determined that the name properties include a name suffix property, determination of the gender classification based on the property value of the name suffix property.

6. A system according to claim 2, the processor to execute the processor-executable process steps to cause the system to:
  determine a script classification based on the name data;
  generation of a substitute property value comprises generation of a substitute property value based on the property associated with the property value, the gender classification, and the script classification.

7. A system according to claim 6, the processor to execute the processor-executable process steps to cause the system to:
  determine an ethnicity classification based on the property values,
  wherein generation of a substitute property value comprises generation of a substitute property value based on the property associated with the property value, the gender classification, the script classification and the ethnicity classification.

8. A system according to claim 2, wherein reception of the name data comprises:
  reception of a first data record includes one or more of name components, each of the one or more name components associated with one or more of the name properties, and,
  the processor to execute the processor-executable process steps to cause the system to:
  generate a second data record associated with the first data record, the second data record including the one or more name components,
  wherein a value of a name component of the second data record comprises one or more substitute property values corresponding to the one or more name properties associated with the name component.

9. A computer-implemented method comprising:
  receiving name data;
  for each of a plurality of name properties, determining an associated property value based on the name data;
  determining a gender classification based on the property values;
  for each property value, generating a substitute property value based on the name property associated with the property value and the gender classification, wherein generation of the substitute property value comprises generation of a substitute property value based on the name property associated with the value, the gender classification and an ethnicity classification and determining an ethnicity classification based on the property values by:
  determining, for each name property, one or more languages associated with the value of the name property and a probability score associated with each of the one or more languages;
  determining a sum of the probability score associated with each of two or more languages;
  determining a maximum sum of the determined sum; and
  determining the ethnicity classification based on the language associated with the maximum sum.

10. A method according to claim 9, wherein determining of the gender classification comprises:
  determining whether the name properties include a name suffix property; and
  if it is determined that the name properties include a name suffix property, determining the gender classification based on the property value of the name suffix property.

11. A method according to claim 9, wherein the probability score determined for a name property is weighted based on a predetermined weight corresponding to the name property, the predetermined weights corresponding to at least two name properties being different and non-zero.

12. A method according to claim 9, further comprising:
  determining a script classification based on the name data, and
  wherein generating a substitute property value comprises generating a substitute property value based on the property associated with the property value, the gender classification, and the script classification.

13. A method according to claim 12, further comprising:
  determining an ethnicity classification based on the property values,
  wherein generating a substitute property value comprises generating a substitute property value based on the property associated with the property value, the gender classification, the script classification and the ethnicity classification.

14. A method according to claim 9, wherein receiving the name data comprises receiving a first data record includes one or more of name components, each of the one or more name components associated with one or more of the name properties, and further comprising:
  generating a second data record associated with the first data record, the second data record including the one or more name components,
  wherein a value of a name component of the second data record comprises one or more substitute property values corresponding to the one or more name properties associated with the name component.

* * * * *